United States Patent
Lee

(10) Patent No.: US 11,290,038 B1
(45) Date of Patent: Mar. 29, 2022

(54) MOTOR CONTROLLER

(71) Applicant: Global Mixed-mode Technology Inc., Hsin-Chu (TW)

(72) Inventor: Rong-Chin Lee, Pingtung County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 7 days.

(21) Appl. No.: 17/015,040

(22) Filed: Sep. 8, 2020

(51) Int. Cl.
*H02P 6/18* (2016.01)
*H02P 6/08* (2016.01)

(52) U.S. Cl.
CPC ............. *H02P 6/186* (2013.01); *H02P 6/08* (2013.01)

(58) Field of Classification Search
CPC ... H02P 6/16; H02P 7/28; H02P 27/06; H02K 11/33
See application file for complete search history.

(56) References Cited

U.S. PATENT DOCUMENTS

| 6,534,938 | B1 * | 3/2003 | Wu ...................... H02P 6/182 |
| | | | 318/400.28 |
| 7,443,119 | B2 * | 10/2008 | Liu ...................... H02P 6/16 |
| | | | 318/400.01 |
| 2015/0042251 | A1 * | 2/2015 | Suzuki ...................... H02P 6/20 |
| | | | 318/400.11 |
| 2018/0183368 | A1 * | 6/2018 | Murakami ............... H02P 6/185 |
| 2018/0234042 | A1 * | 8/2018 | Aoki ...................... H02P 6/185 |

FOREIGN PATENT DOCUMENTS

| CN | 101047353 A | 10/2007 |
| CN | 101232266 A | 7/2008 |
| CN | 108400739 A | 8/2018 |
| TW | 200423529 | 11/2004 |
| TW | 201733259 A | 9/2017 |

* cited by examiner

*Primary Examiner* — Said Bouziane
(74) *Attorney, Agent, or Firm* — Winston Hsu

(57) ABSTRACT

A motor controller is configured to stabilize a motor current. The motor controller is used for driving a motor, where the motor has a motor coil. The motor controller comprises a switch circuit, a control unit, a command unit, a counting unit, a comparing unit, and a phase detecting unit. The switch circuit is used for supplying the motor current to the motor coil. The phase detecting unit generates a phase signal to the control unit, so as to inform the control unit to switch phases. The control unit generates a plurality of control signals to control the switch circuit. The motor controller resets the counting unit based on the phase signal, such that the control signals are synchronized with the phase signal for stabilizing the motor current.

15 Claims, 4 Drawing Sheets

MOTOR CONTROLLER

BACKGROUND OF THE INVENTION

1. Field of the Invention

The present invention relates to a motor controller, and more particularly, to a motor controller which is used for stabilizing the motor current.

2. Description of the Prior Art

FIG. 1 is a circuit diagram showing a conventional motor controller 10. The motor controller 10 is used for driving a motor, where the motor has a motor coil L. The motor coil L has a first terminal O1 and a second terminal O2. The motor controller 10 comprises a switch circuit 100, a control unit 110, and a phase detecting unit 120. The switch circuit 100 is coupled to a voltage source VCC and the voltage source VCC generates a supply current IVCC to the switch circuit 100. The switch circuit 100 is configured to supply a motor current to the motor coil L, where the motor current may be analogous to the supply current IVCC. The phase detecting unit 120 generates a phase signal Vph to the control unit 110, so as to inform the control unit 110 to switch phases. The control unit 110 generates a plurality of driving signals to the switch circuit 100, so as to control the voltage of the first terminal O1 and the voltage of the second terminal O2. FIG. 2 is a timing chart showing the related signals of FIG. 1. Since the driving signals outputted by the control unit 110 are not synchronized with the phase signal Vph, the voltage signal of the first terminal O1 and the voltage signal of the second terminal O2 are not synchronized with the phase signal Vph. Thus, the supply current IVCC does not have a fixed initial value after switching phases each time. That is to say, the asynchronous operation results in the unstable motor current.

Thus, what is needed is the motor controller which is capable of stabilizing the motor current.

SUMMARY OF THE INVENTION

According to embodiments of the present invention, a motor controller which is capable of stabilizing a motor current is provided. The motor controller is used for driving a motor, where the motor has a motor coil. The motor coil has a first terminal and a second terminal. The motor controller comprises a switch circuit, a control unit, a command unit, a counting unit, a comparing unit, and a phase detecting unit. The switch circuit is coupled to a voltage source and the voltage source generates a supply current to the switch circuit. The switch circuit is configured to supply the motor current to the motor coil, where the motor current may be analogous to the supply current. The switch circuit includes a first transistor, a second transistor, a third transistor, and a fourth transistor. The first transistor, the second transistor, the third transistor, and the fourth transistor may be respectively a p-type MOSFET or an n-type MOSFET.

The control unit generates a first control signal, a second control signal, a third control signal, and a fourth control signal so as to respectively control the ON/OFF states of the first transistor, the second transistor, the third transistor, and the fourth transistor. The phase detecting unit generates a phase signal to the control unit, so as to inform the control unit to switch phases. In addition, the phase detecting unit generates the phase signal to the counting unit for resetting the counting unit. The command unit receives an external pulse width modulation signal for generating a command signal to the comparing unit. The counting unit receives the phase signal for generating an output signal to the comparing unit. The comparing unit generates a pulse width modulation signal to the control unit by comparing the command signal and the output signal.

When the phase signal changes from a low level to a high level or from the high level to the low level, it enables the counting unit to be reset, such that the output signal has a fixed initial value after switching phases. Based on the pulse width modulation signal and the phase signal, the control unit is configured to output the first control signal, the second control signal, the third control signal, and the fourth control signal, which are synchronized with the phase signal. Thus, the voltage signal of the first terminal and the voltage signal of the second terminal are synchronized with the phase signal, such that the supply current has a stable current waveform after switching phases for stabilizing the motor current.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
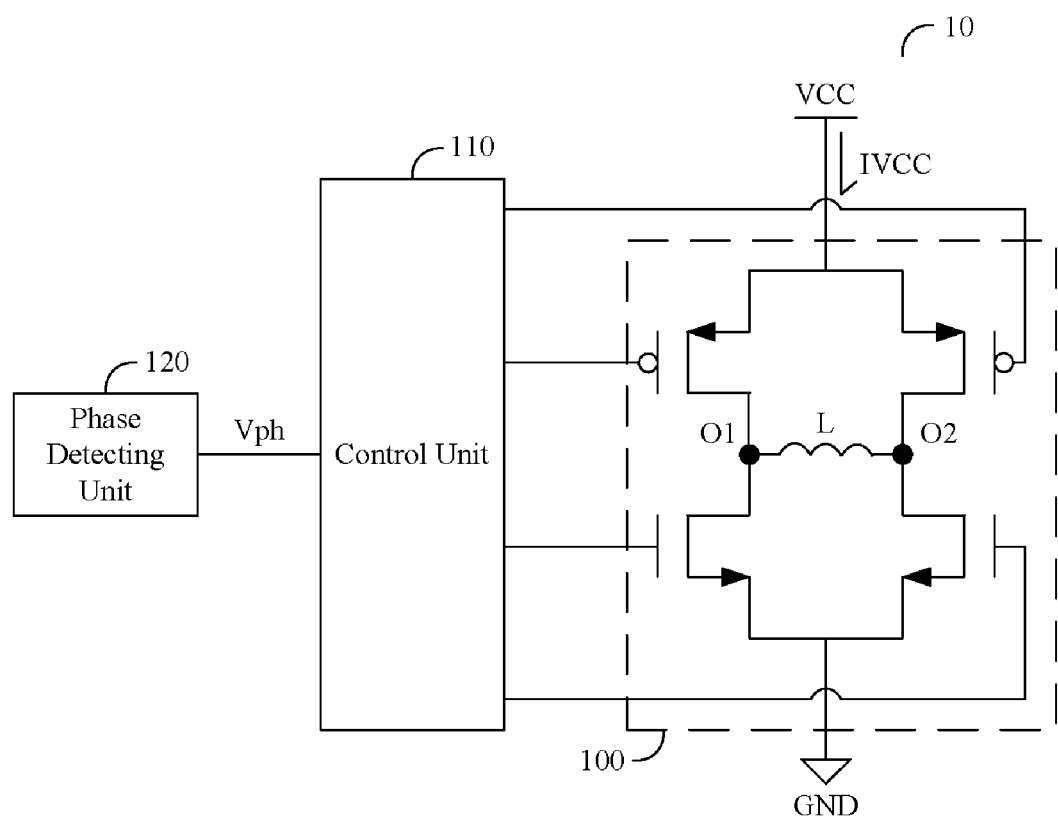
FIG. 1 is a circuit diagram showing a conventional motor controller.
Figure 2:
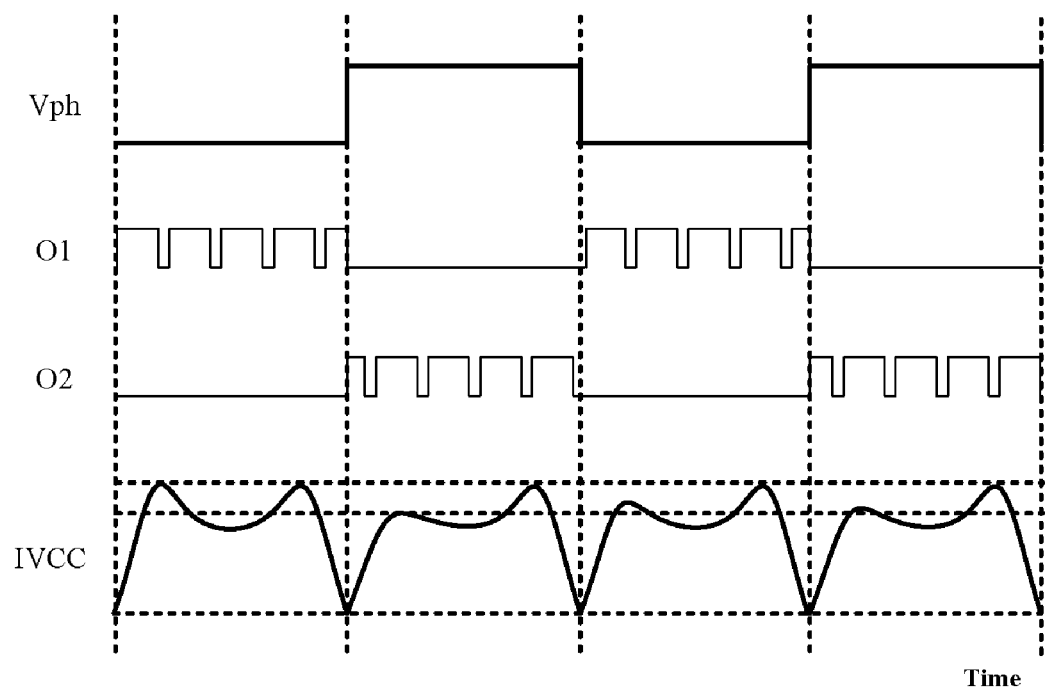
FIG. 2 is a timing chart showing the related signals of FIG. 1.
Figure 3:
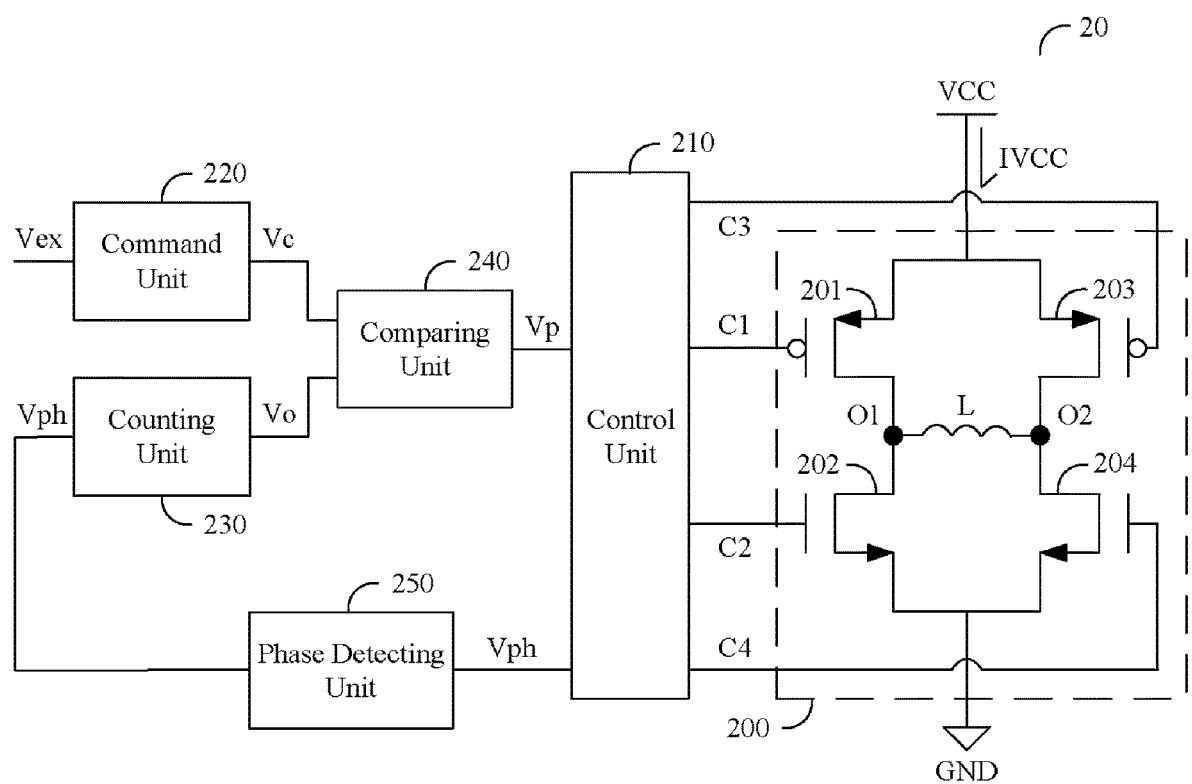
FIG. 3 is a circuit diagram showing a motor controller according to one embodiment of the present invention.

FIG. 3 is a circuit diagram showing a motor controller 20 according to one embodiment of the present invention. The motor controller 20 is used for driving a motor, where the motor has a motor coil L. The motor coil L has a first terminal O1 and a second terminal O2. The motor controller 20 comprises a switch circuit 200, a control unit 210, a command unit 220, a counting unit 230, a comparing unit 240, and a phase detecting unit 250. The switch circuit 200 is coupled to a voltage source VCC and the voltage source VCC generates a supply current IVCC to the switch circuit 200. The switch circuit 200 is configured to supply a motor current to the motor coil L, where the motor current may be analogous to the supply current IVCC. The switch circuit 200 includes a first transistor 201, a second transistor 202, a third transistor 203, and a fourth transistor 204. The first transistor 201 is coupled to the voltage source VCC and the first terminal O1 while the second transistor 202 is coupled to the first terminal O1 and a ground GND. The third transistor 203 is coupled to the voltage source VCC and the second terminal O2 while the fourth transistor 204 is coupled to the second terminal O2 and the ground GND. The first transistor 201, the second transistor 202, the third transistor 203, and the fourth transistor 204 may be respectively a p-type MOSFET or an n-type MOSFET. As shown in FIG. 3, each of the first transistor 201 and the third transistor 203 may be a p-type MOSFET, while each of the second transistor 202 and the fourth transistor 204 may be an n-type MOSFET.

The control unit 210 generates a first control signal C1, a second control signal C2, a third control signal C3, and a fourth control signal C4 so as to respectively control the ON/OFF states of the first transistor 201, the second transistor 202, the third transistor 203, and the fourth transistor 204. The control unit 210 operates alternatively in a first driving mode and a second driving mode, so as to supply the electric energy to the motor. In the first driving mode, the control unit 210 turns on the first transistor 201 and the fourth transistor 204 by controlling the first control signal C1 and the fourth control signal C4. At this moment the current flows sequentially from the voltage source VCC to the first transistor 201, the motor coil L, and the fourth transistor 204 for supplying the electric energy to the motor. In the second driving mode, the control unit 210 turns on the second transistor 202 and the third transistor 203 by controlling the second control signal C2 and the third control signal C3. At this moment the current flows sequentially from the voltage source VCC to the third transistor 203, the motor coil L, and the second transistor 202 for supplying the electric energy to the motor. By operating alternatively between the first driving mode and the second driving mode, the motor can be rotated normally as a result.

The phase detecting unit 250 generates a phase signal Vph to the control unit 210, so as to inform the control unit 210 to switch phases, where the phase detecting unit 250 may be a Hall sensor or a back-electromotive force detecting circuit. The hall sensor may be placed nearby the motor for sensing the magnetic field variation of the motor. The motor controller 20 operates alternatively between the first driving mode and the second driving mode to drive the motor based on the motor rotor position sensed by the Hall sensor. The back-electromotive force detecting circuit detects the zero-crossing point of the back-electromotive force to switch phases. The designer can select either the Hall sensor or the back-electromotive force detecting circuit to design the phase detecting unit 250 based on the motor configuration.

In addition, the phase detecting unit 250 generates the phase signal Vph to the counting unit 230 for resetting the counting unit 230. The command unit 220 receives an external pulse width modulation signal Vex for generating a command signal Vc to the comparing unit 240. The counting unit 230 receives the phase signal Vph for generating an output signal Vo to the comparing unit 240. The comparing unit 240 generates a pulse width modulation signal Vp to the control unit 210 by comparing the command signal Vc and the output signal Vo, where the pulse width modulation signal Vp has a duty cycle. According to one embodiment of the present invention, the motor controller 20 uses the pulse width modulation technique for adjusting the motor current, so as to save the electric energy and control the motor speed. When the duty cycle approaches 1, it indicates that the voltage source VCC delivers the electric energy to the motor almost in full capability. When the duty cycle approaches 0, it indicates that the voltage source VCC delivers very tiny amount of electric energy to the motor.

Figure 4:
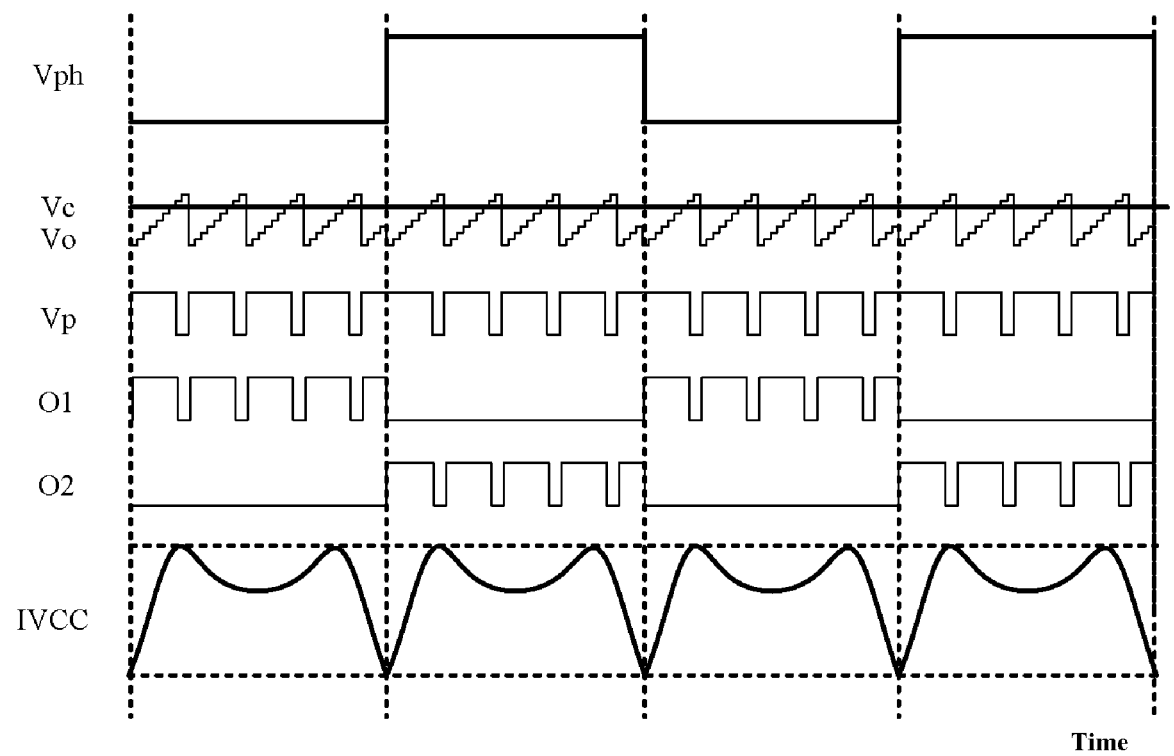
FIG. 4 is a timing chart showing the related signals of FIG. 3 according to one embodiment of the present invention.

FIG. 4 is a timing chart showing the related signals of FIG. 3 according to one embodiment of the present invention. More specifically, when the phase signal Vph changes from a low level L to a high level H or from the high level H to the low level L, it enables the counting unit 230 to be reset, such that the output signal Vo has a fixed initial value after switching phases. Then the output signal Vo increases with time. The desired duty cycle can be obtained by comparing the command signal Vc and the output signal Vo. Consequently, the pulse width modulation signal Vp also has a fixed duty cycle after switching phases. Based on the pulse width modulation signal Vp and the phase signal Vph, the control unit 210 is configured to output the first control signal C1, the second control signal C2, the third control signal C3, and the fourth control signal C4, which are synchronized with the phase signal Vph. As shown in FIG. 4, the voltage signal of the first terminal O1 and the voltage signal of the second terminal O2 are synchronized with the phase signal Vph, such that the supply current IVCC has a stable current waveform after switching phases for stabilizing the motor current.

According to one embodiment of the present invention, the comparing unit 240 may be an analog comparator or a digital comparator. For instance, when the comparing unit 240 is the digital comparator, the command signal Vc may be an N-bit digital command signal and the output signal Vo may be an N-bit digital output signal, where N is greater than 1 or equal to 1. The comparing unit 240 is capable of obtaining the desired duty cycle to control the motor speed by comparing the N-bit digital command signal and the N-bit digital output signal.

According to one embodiment of the present invention, the motor controller 20 can be applied to a single-phase or polyphase configuration. Also, the motor controller 20 can be applied to an inductive actuator, such as a brushless motor, a DC motor, a voice coil motor, or an electromagnetic actuator. The motor controller 20 resets the counting unit 230 based on the phase signal Vph, such that the control signals are synchronized with the phase signal Vph for stabilizing the motor current.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, wherein the motor has a motor coil, the motor coil has a first terminal and a second terminal, and the motor controller comprises:
   a switch circuit, configured to supply a motor current to the motor coil;
   a control unit, configured to generate a plurality of control signals for controlling the switch circuit;
   a counting unit, configured to generate an output signal;
   a command unit, configured to generate a command signal;
   a comparing unit, configured to compare the command signal with the output signal for generating a pulse width modulation signal to the control unit; and
   a phase detecting unit, configured to generate a phase signal to the control unit for switching phases, wherein the motor controller resets the counting unit based on the phase signal, thereby stabilizing the motor current.

2. The motor controller of claim 1, wherein the control signals are synchronized with the phase signal.

3. The motor controller of claim 1, wherein a voltage signal applied to the first terminal and a voltage signal applied to the second terminal are synchronized with the phase signal.

4. The motor controller of claim 1, wherein the output signal has a fixed initial value after switching the phases.

5. The motor controller of claim 1, wherein the counting unit is reset when the phase signal is changed from a low level to a high level or from the high level to the low level.

6. The motor controller of claim 1, wherein the motor controller is applied to a single-phase or polyphase configuration.

7. The motor controller of claim 1, wherein the comparing unit is a digital comparator.

8. The motor controller of claim 1, wherein the pulse width modulation signal has a fixed duty cycle after switching the phases.

9. A motor controller configured to drive a motor, wherein the motor has a motor coil, the motor coil has a first terminal and a second terminal, and the motor controller comprises:
   a switch circuit, configured to supply a motor current to the motor coil;
   a control unit, configured to generate a plurality of control signals for controlling the switch circuit;
   a counting unit, configured to generate an output signal;
   a command unit, configured to generate a command signal;
   a comparing unit, configured to compare the command signal with the output signal for generating a pulse width modulation signal to the control unit; and
   a phase detecting unit, configured to generate a phase signal to the control unit for switching phases, wherein the motor controller resets the counting unit based on the phase signal, and the control signals are synchronized with the phase signal.

10. The motor controller of claim 9, wherein a voltage signal applied to the first terminal and another voltage signal applied to the second terminal are synchronized with the phase signal.

11. The motor controller of claim 9, wherein the output signal has a fixed initial value after switching the phases.

12. The motor controller of claim 9, wherein the counting unit is reset when the phase signal is changed from a low level to a high level or from the high level to the low level.

13. The motor controller of claim 9, wherein the motor controller is applied to a single-phase or polyphase configuration.

14. The motor controller of claim 9, wherein the comparing unit is a digital comparator.

15. The motor controller of claim 9, wherein the pulse width modulation signal has a fixed duty cycle after switching the phases.

* * * * *